United States Patent [19]

Thomason

[11] Patent Number: 5,327,928

[45] Date of Patent: Jul. 12, 1994

[54] AIR SEAL VALVE

[75] Inventor: Brian D. Thomason, Mesa, Ariz.

[73] Assignee: Salem Engelhard, South Lyon, Mich.

[21] Appl. No.: 87,658

[22] Filed: Jul. 6, 1993

[51] Int. Cl.⁵ .............................................. F16K 1/22
[52] U.S. Cl. ................................ 137/246.22; 251/307
[58] Field of Search ..................... 251/305, 306, 307; 137/246, 246.22

[56] References Cited

U.S. PATENT DOCUMENTS

| | | | |
|---|---|---|---|
| 2,392,922 | 1/1946 | Hopkins | 137/246.22 X |
| 3,749,115 | 7/1973 | Raftis | 137/246.22 |
| 4,077,432 | 3/1978 | Herr | 137/246.22 X |
| 4,335,738 | 6/1982 | Nassir | 137/246.22 |
| 5,000,422 | 3/1991 | Houston | 137/246.22 X |

Primary Examiner—John C. Fox
Attorney, Agent, or Firm—Lyman R. Lyon

[57] ABSTRACT

An air seal valve comprises an annular valve body having a circular valve plate disposed internally thereof with a pair of axially spaced valves thereon defining a fresh air plenum, one of said valves comprising a truncated conical plate having a radially outer edge engageable with the valve body to effect a seal thereagainst.

2 Claims, 2 Drawing Sheets

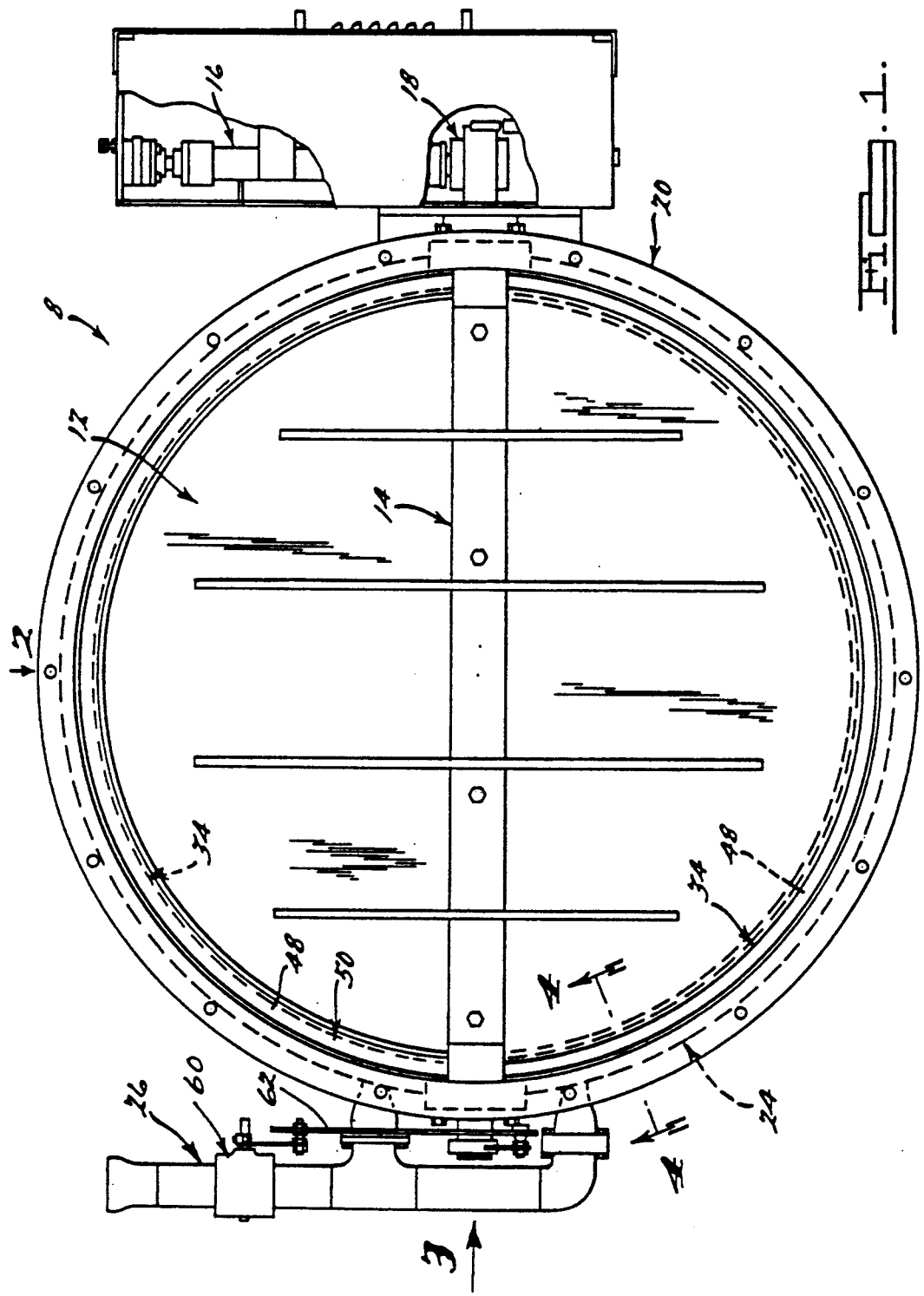

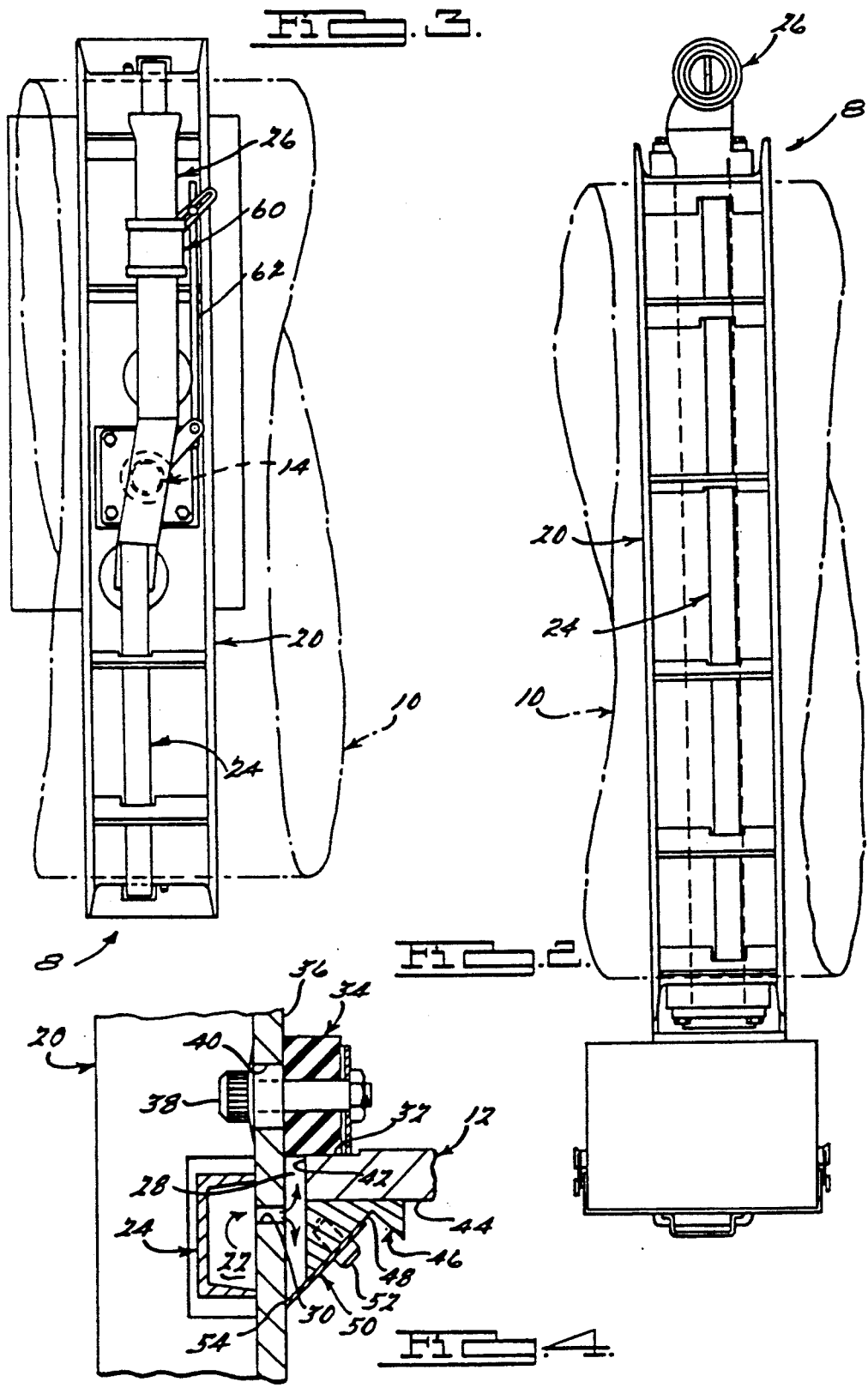

AIR SEAL VALVE

BACKGROUND OF THE INVENTION

The air seal valve of the present invention is an improvement on the valve disclosed in U.S. Pat. No. 5,000,422, which is assigned to the assignee of the present invention.

Incinerators are widely used to increase the temperature of process emissions to a temperature above the ignition temperature of combustible contaminants therein so as to oxidize the contaminants. Leakage of contaminated emissions past the relatively large flow control valves required for control of fluid flow to and from the incinerators cannot be tolerated. As disclosed in the aforesaid patent, such flow control valves selectively direct the emissions into one or more regenerators or high temperature combustion chambers, or vent the flow of decontaminated gases to atmosphere. Leakage the flow control valves seriously comprises the efficiency of the incinerator system and may result in significant air pollution.

SUMMARY OF THE INVENTION

An air seal valve in accordance with the present invention has particular utility in regenerative incinerator systems for the abatement of process emissions. The herein disclosed air seal valve solves the problem of valve leakage by providing a positive pressure differential across the seating surfaces of the valve that precludes leakage of emissions when the valve is in the closed condition. Specifically, the air seal valve comprises a circular blade that is rotatable about an axis extending diametrically thereof within a cylindrical valve body. The blade has two axially spaced seal surfaces on the periphery thereof that, in conjunction with complementary axially spaced valve seats or sealing surfaces on the valve body, define an annular inner plenum for the acceptance of pressurized clean air from a radially outer plenum. The clean air flow from the outer plenum to the inner plenum is maintained at a pressure above that of the contaminated emissions within a pipe containing the air seal valve. The inner plenum is defined in part by a primary face seal that is engagable with a primary valve seat on the valve body and in part by a novel secondary edge seal that is slidably engagable with a secondary valve seat on the valve body.

BRIEF DESCRIPTION OF THE DRAWINGS

FIG. 1 is an elevational view of the improved air seal valve of the instant invention in the closed condition;

FIG. 2 is a view taken in the direction of the arrow 2 of FIG. 1;

FIG. 3 is a view taken in the direction of the arrow 3 of FIG. 1; and

FIG. 4 is an enlarged fragmentary view taken along the line 4—4 of FIG. 1.

DETAILED DESCRIPTION OF THE PREFERRED EMBODIMENT(S)

As seen in FIG. 1, and in accordance with a preferred constructed embodiment of the present invention, an air seal valve 8 for a conduit 10 comprises a circular blade 12 that is mounted for rotation on a shaft 14 that extends diametrically thereof. The shaft 14 is rotated by, for example, a hydraulic actuator 16 through a conventional rack and pinion linkage 18. An annular valve body 20, made from, for example, a channel of U-shaped cross section that is rolled to the circular configuration, surrounds the blade 12 for the support of the shaft 14 and seals to be described.

As best seen in FIG. 4, an annular outer plenum 22, defined in part by a channel 24 of U-shaped cross section, is disposed about the valve body 20 in radial alignment with the blade 12 when the blade 12 is in the closed condition. Fresh air is conducted to the outer plenum 22 by a manifold 26 (FIG. 1) that is connected to a source of pressurized fresh air (not shown). Fresh air flows from the outer plenum 22 to an inner plenum 28, through apertures 30 in the valve body 20.

When the blade 12 is in the closed position relative to the valve body 20, a primary seal surface 32 on the blade 12 seats against a primary valve seat 34 that extends circumferentially of the valve body 20 against an inner wall surface 36 thereof. The primary valve seat 34 is secured to the valve body 20 by a plurality of fasteners 38 that extend through apertures 40 in the valve body 20 that are of larger diameter than the fasteners 38 so as to provide for adjustment of the valve seat 34 upon initial closing of the primary valve seal surface 32 of the blade 12 thereagainst. A circumferentially extending edge face 42 of the blade 12 is radially spaced from the inner surface 36 of the valve body 20 to provide clearance and to define, in part, the inner plenum 28.

In accordance with one feature of the present invention, a radial surface 44 of the blade 12 opposite from the primary seal surface 32 supports an annular secondary valve retainer 46 that has a radially inwardly convergent surface 48 thereon for the acceptance of a complementary truncated conical, plate type, secondary valve 50. The secondary valve 50 is secured to the valve retainer 46 by a plurality of machine screws 52 that provide for radial adjustment of seating pressure of a secondary valve surface 54 on the valve 50 against the radially inner wall 36 of the valve body 20 to effect a secondary seal therewith as well as to define one wall of the inner plenum 28.

The secondary valve 50 is essentially self-adjusting in terms of the sealing interface with the radially inner wall 36 of the valve body 20. The fasteners 52 need only be backed off upon initial closing of the blade 12 allowing the secondary valve 50 to move radially relative to its support 48. Moreover, repeated closing of the valve 8 will abrasively seat the secondary valve 50 against its complementary seating surface 36 on the valve body 20. Wear is compensated by merely adjusting the secondary valve 50 radially outwardly.

In operation, when the valve 8 is closed, clean air under pressure greater than the pressure of contaminated emissions in the conduit 10, is conducted by the manifold 26 to the outer plenum 22. The clean air flows from the plenum 22 through the apertures 30 in the valve body 20 to the inner plenum 28. In the event a perfect seal between either the primary valve surface 32 on the blade 12 and its seat 34 or the valve surface 54 of the secondary valve 50 and the inner wall 36 of the valve body 20 is not obtained, fresh air flows through the leak path into the conduit 10, ensuring that contaminated emissions do not escape past the valve 8. Control of fresh air flow is accomplished by a valve 60 in the manifold 26 which is actuated through a linkage 62 when the shaft 14 and blade 12 are rotated by the actuator 16.

While the preferred embodiment of the invention has been disclosed, it should be appreciated that the invention is susceptible of modification without departing from the scope of the following claims.

I claim:

1. An air seal valve comprising:

a right circular cylindrical valve body;

a rotatable support shaft extending diametrically of said valve body;

a circular valve blade on said shaft;

an annular primary valve seat on a radially inner surface of said valve body having a radially extending seating face;

an annular primary valve face on said valve blade engageable with the radially extending seating face on said primary valve seat;

a cylindrical secondary valve seat on the radially inner surface of said valve body axially spaced from said primary valve seat and having a cylindrical secondary seating face;

a secondary valve on said valve blade axially spaced from said primary valve and of annular truncated conical configuration having a circular radially outer seating edge engageable with the cylindrical secondary seating face on said secondary valve seat;

a fresh air plenum disposed between said primary and secondary valve seats; and means for conducting fresh air under pressure to said plenum.

2. The valve of claim 1 wherein said secondary valve is radially adjustable relative to said valve blade.

* * * * *